United States Patent
Raisch et al.

(10) Patent No.: US 8,250,260 B2
(45) Date of Patent: Aug. 21, 2012

(54) METHOD, ARRANGEMENT, DATA PROCESSING PROGRAM AND COMPUTER PROGRAM PRODUCT FOR EXCHANGING MESSAGE DATA IN A DISTRIBUTED COMPUTER SYSTEM

(75) Inventors: Christoph Raisch, Boeblingen (DE);
Jan-Bernd Themann, Boeblingen (DE);
Jonas Eymann, Hamburg (DE); Moritz Prinz, Hamm (DE); Enrique Marcial-Simon, Giebelstadt (DE);
Thomas Ilsche, Dresden (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/966,059

(22) Filed: Dec. 13, 2010

(65) Prior Publication Data

US 2011/0145533 A1 Jun. 16, 2011

(30) Foreign Application Priority Data

Dec. 15, 2009 (EP) .................................... 09179289

(51) Int. Cl.
*G06F 3/00* (2006.01)

(52) U.S. Cl. ................. 710/54; 710/52; 710/53; 710/62
(58) Field of Classification Search ........................ None
See application file for complete search history.

(56) References Cited

U.S. PATENT DOCUMENTS

| 6,463,483 B1 * | 10/2002 | Imperiali ........................ 710/35 |
| 2003/0041176 A1 * | 2/2003 | Court et al. .................... 709/251 |
| 2008/0086617 A1 * | 4/2008 | Kasahara et al. ............. 711/167 |

* cited by examiner

*Primary Examiner* — Eron J Sorrell
(74) *Attorney, Agent, or Firm* — Dennis Jung

(57) ABSTRACT

A method for exchanging message data in a distributed computer system between a sending and a receiving hardware system. The sending hardware system includes a first memory system and a receiving hardware system which includes a second memory system with a second data buffer and a second memory region. The sending hardware system and the receiving hardware system are coupled via a non-transparent bridge unit. The method includes allocating empty memory, writing information about the empty memory, copying payload data directly from the sending hardware system to the empty memory locations, and writing information about the copied payload data to the second data buffer of the second memory system inside the receiving hardware system. A system and computer program product for carrying out the method are also provided.

6 Claims, 4 Drawing Sheets

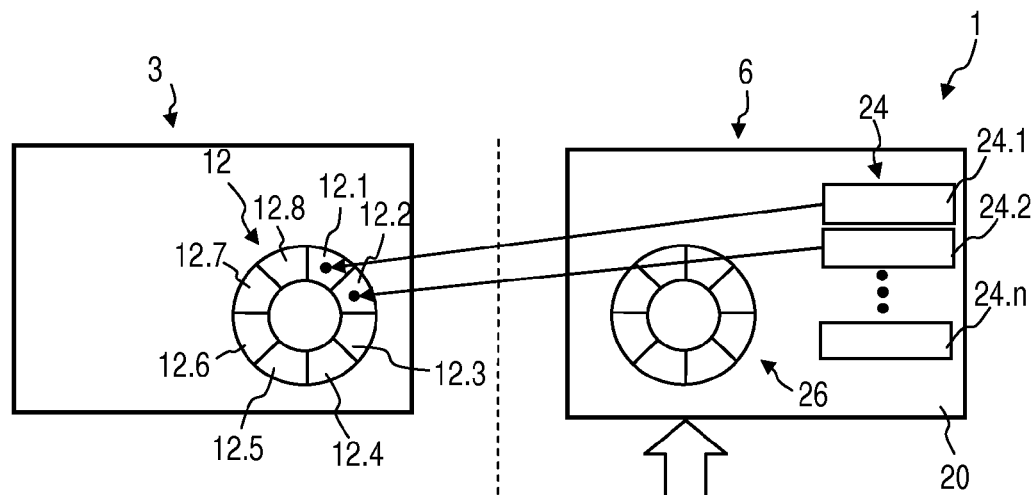
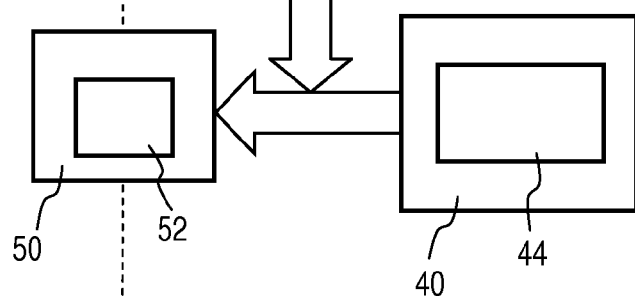
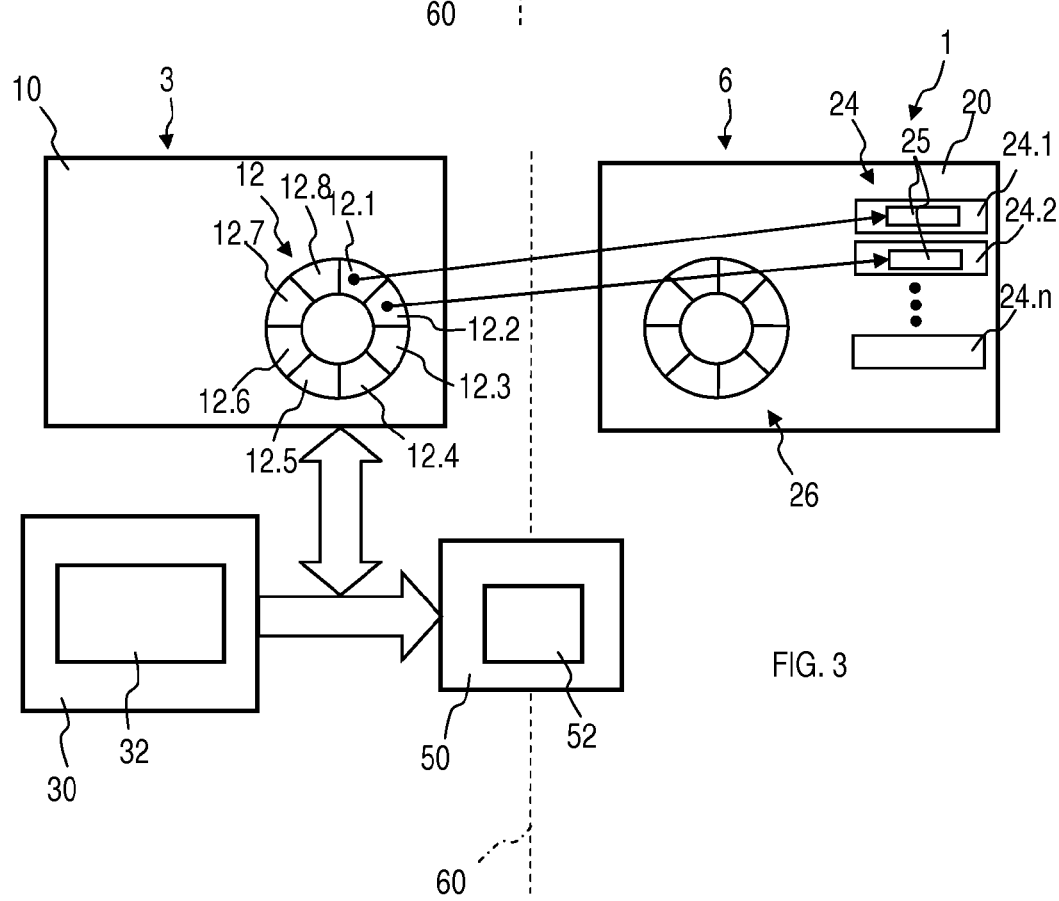
FIG. 2
FIG. 3

METHOD, ARRANGEMENT, DATA PROCESSING PROGRAM AND COMPUTER PROGRAM PRODUCT FOR EXCHANGING MESSAGE DATA IN A DISTRIBUTED COMPUTER SYSTEM

CROSS REFERENCE TO RELATED APPLICATION

This application claims priority under 35 U.S.C. §119 from European Patent Application No. 09179289.5 filed Dec. 15, 2009, the entire contents of which are incorporated herein by reference.

BACKGROUND OF THE INVENTION

1. Field of the Invention

The present invention relates in general to the field of computer networks and distributed computer systems, and in particular to a method and an arrangement for exchanging message data in a distributed computer system. Still more particularly, the present invention relates to a data processing program and a computer program product for performing the method for exchanging message data in a distributed computer system.

2. Description of the Related Art

Existing PCI adapters running their own operating system are controlled by proprietary protocols. Each new adapter gets a new control path, with new designed data transfer protocols.

In a related art embodiment of a distributed computer system, a first computer system is acting as a sending hardware system and a second computer system is acting as a receiving hardware system to exchange data, wherein the sending hardware system and the receiving hardware system are coupled via a non-transparent bridge unit. The sending hardware system includes a first central processing unit (CPU) and a first memory system with a remote metadata buffer and a first memory region and the receiving hardware system includes a second central processing unit (CPU) and a second memory system with a message data buffer and a second memory region. The receiving hardware system transfers an ownership of the message buffer to the sending hardware system and the sending hardware system manages the static message buffer of the receiving hardware system. The sending hardware system tells the receiving hardware system where data has been stored in the message buffer. Then the receiving hardware system copies the data from that position to the target memory position inside the second memory region of the second memory system. Thus two copy operations are needed on the receiving hardware system side.

In Patent Application Publication US 2003/0041176 A1 "Data transfer algorithm that does not require high latency read operations" by Court et al. a mechanism for the controlled transfer of data across LDT and PCI buses without requiring any high latency read operations is disclosed. The disclosed mechanism removes the need for any read accesses to a remote processors memory or device registers, while still permitting controlled data exchange. This approach provides significant performance improvement for systems that have write buffering capability. A described data transfer apparatus includes a first processor and a second processor in communication with the first processor via a data exchange path. Each processor includes a set of four counters that are organized as two pairs, where one pair of counters is used by a transmit channel via a data exchange path and a second pair of counters is used by a receive channel via a data exchange channel. The processors reserve remote buffers to coordinate the exchange of data packets by writing to the counters remotely and reading from the counters locally, wherein the processors exchange the data packets with posting operations and without resort to remote read operations.

SUMMARY OF THE INVENTION

In one aspect of the invention, a method for exchanging message data in a Distributed computer system between i) a sending hardware system which comprises a first memory system with a first data buffer and a first memory region and ii) a receiving hardware system which comprises a second memory system with a second data buffer and a second memory region, wherein the sending hardware system and the receiving hardware system are coupled via a non-transparent bridge unit is presented. The method includes the steps of:

allocating empty memory locations inside the second memory region of the second memory system inside the receiving hardware system;

writing information about the empty memory locations to the first data buffer of the first memory system inside the sending hardware system;

copying payload data directly from the sending hardware system to the empty memory locations inside the second memory region of the second memory system inside the receiving hardware system according to the information written to the first data buffer; and writing information about the copied payload data to the second data buffer of the second memory system inside the receiving hardware system.

In another aspect of the invention, a system for exchanging message data in a distributed computer system between i) a sending hardware system comprising a first memory system with a first data buffer and a first memory region and ii) a receiving hardware system comprising a second memory system with a second data buffer and a second memory region, wherein the sending hardware system and the receiving hardware system are coupled via a non-transparent bridge unit is presented. The system includes:

a message send engine located inside the sending hardware system and a message receive engine located inside the receiving hardware system; wherein:

the first data buffer located inside the sending hardware system is assigned to the message receive engine inside the receiving hardware system;

the second data buffer located inside the receiving hardware system is assigned to the message send engine inside the sending hardware system;

the message receive engine allocates empty memory locations inside the second memory region of the second memory system inside the receiving hardware system, and writes information about the empty memory locations to the first data buffer of the first memory system;

the message send engine copies payload data directly from the sending hardware system to the empty memory locations inside the second memory region of the second memory system inside the receiving hardware system according to the information written to the first data buffer; and the message send engine writes information about the copied payload data to the second data buffer of the second memory system inside the receiving hardware system.

In yet another aspect of the present invention, a computer program product stored on a computer-usable medium, including computer-readable program means for causing a computer to perform a method for exchanging message data in a distributed computer system when the program is run on the computer is presented. The method includes:

allocating empty memory locations inside a second memory region of a second memory system inside a receiving hardware system;

writing information about the empty memory locations to a first data buffer of a first memory system inside a sending hardware system;

copying payload data directly from the sending hardware system to the empty memory locations inside the second memory region of the second memory system inside the receiving hardware system according to the information written to the first data buffer; and writing information about the copied payload data to a second data buffer of the second memory system inside the receiving hardware system.

BRIEF DESCRIPTION OF THE DRAWINGS

A preferred embodiment of the invention, as described in detail below, is shown in the drawings, in which:

FIGS. 2 to 4 are block diagrams of parts of the arrangement for exchanging message data in the distributed computer system of FIG. 1, each showing a different situation during the transfer of message data, in accordance with an embodiment of the present invention.

DETAILED DESCRIPTION OF THE PREFERRED EMBODIMENTS

Figure 1:
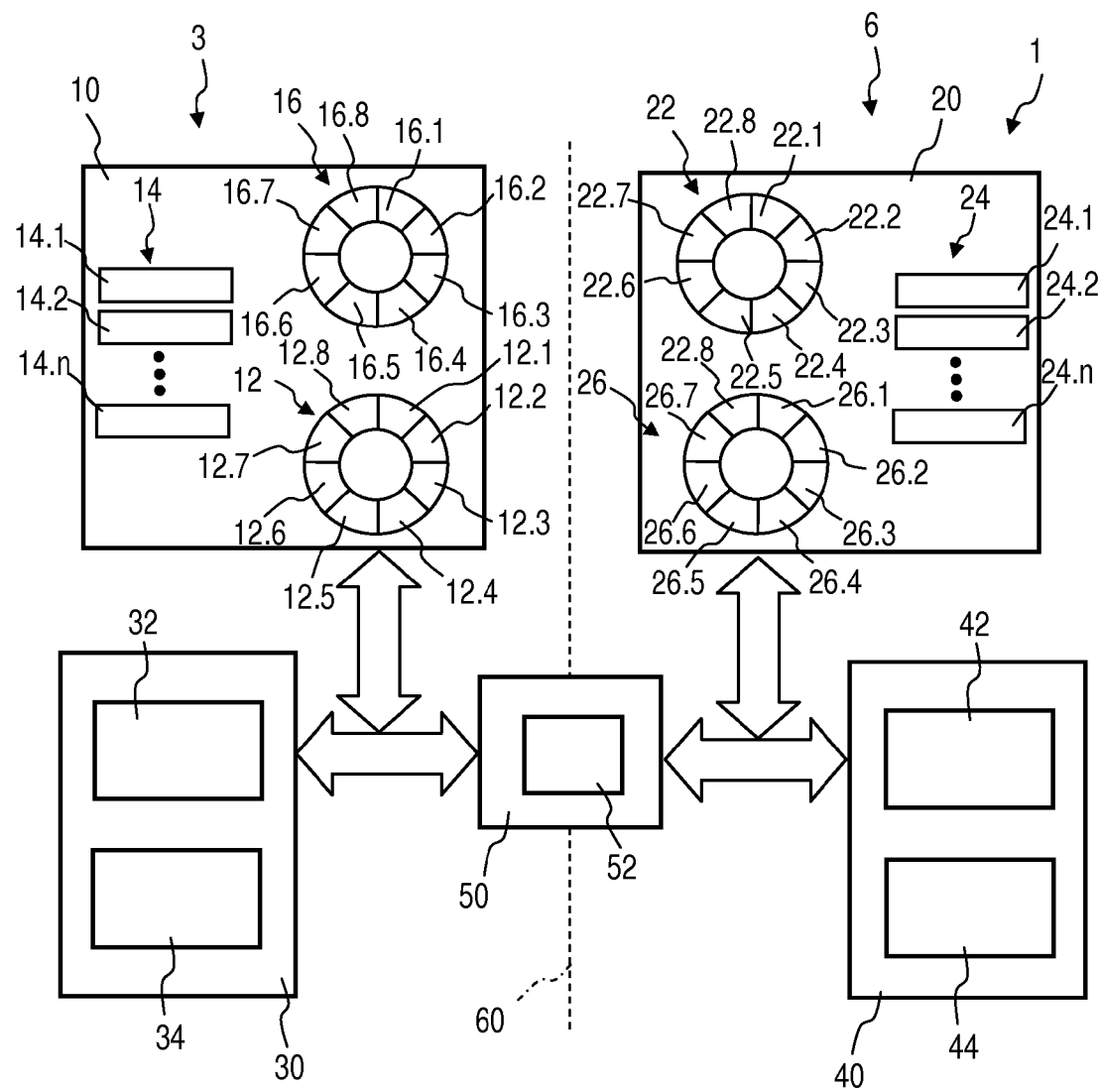
FIG. 1 is a schematic block diagram of an arrangement for exchanging message data in a distributed computer system, in accordance with an embodiment of the present invention.

The technical problem underlying the invention is to provide a method and an arrangement for exchanging message data in a distributed computer system, which are able to reduce latency and to improve the throughput in a non-transparent bridge, a data processing program and a computer program product to perform the method for exchanging message data in a distributed computer system.

An embodiment of the present invention is a method for exchanging message data in a distributed computer system between a sending hardware system including a first memory system with a first data buffer and a first memory region and a receiving hardware system including a second memory system with a second data buffer and a second memory region. The sending hardware system and the receiving hardware system are coupled via a non-transparent bridge unit. The method includes allocating empty memory locations inside the second memory region of the second memory system inside the receiving hardware system, writing information about the empty memory locations to the first data buffer of the first memory system inside the sending hardware system, copying payload data directly from the sending hardware system to the empty memory locations inside the second memory region of the second memory system inside the receiving hardware system according to the information written to the first data buffer, and writing information about the copied payload data to the second data buffer of the second memory system inside the receiving hardware system.

In further embodiments of the present invention, the information about the empty memory locations written in the first data buffer include mapped address data and/or memory location length information for each empty memory location.

In further embodiments of the present invention, the information about the copied payload data written in the second data buffer include length information for each payload data set copied in an empty memory location.

In further embodiments of the present invention, the first data buffer includes toggle bits indicating empty memory locations inside the second memory region when changed, wherein the toggle bits inside the first data buffer are checked before payload data are copied to the second memory region of the second memory system inside the receiving hardware system.

In further embodiments of the present invention, the second data buffer includes toggle bits indicating newly copied payload data when changed, wherein the toggle bits inside the second data buffer are checked before empty memory locations are allocated inside the second memory region of the second memory system inside the receiving hardware system.

In another embodiment of the present invention an arrangement for exchanging message data in a distributed computer system between a sending hardware system including a first memory system with a first data buffer and a first memory region and a receiving hardware system including a second memory system with a second data buffer and a second memory region is provided. The sending hardware system and the receiving hardware system are coupled via a non-transparent bridge unit, and includes a message send engine located inside the sending hardware system and a message receive engine located inside the receiving hardware system. The first data buffer located inside the sending hardware system is assigned to the message receive engine inside the receiving hardware system and the second data buffer located inside the receiving hardware system is assigned to the message send engine inside the sending hardware system.

The message receive engine allocates empty memory locations inside the second memory region of the second memory system inside the receiving hardware system, and writes information about the empty memory locations to the first data buffer of the first memory system, wherein the message send engine copies payload data directly from the sending hardware system to the empty memory locations inside the second memory region of the second memory system inside the receiving hardware system according to the information written to the first data buffer, and wherein the message send engine writes information about the copied payload data to the second data buffer of the second memory system inside the receiving hardware system.

In further embodiments of the present invention, the non-transparent bridge unit is implemented as PCI express bus bridge unit including an address translation unit, wherein the first memory system and/or the second memory system are mapped to the non-transparent bridge unit.

In further embodiments of the present invention, the first data buffer and/or the second data buffer are implemented as ring data buffers.

In further embodiments of the present invention, the message receive engine sets a corresponding toggle bit inside the first data buffer to a valid status when information about an empty memory location is written in a related buffer location of the first data buffer.

In further embodiments of the present invention, the message send engine checks the valid status of the toggle bits inside the first data buffer before copying payload data to the second memory region of the second memory system inside the receiving hardware system.

In further embodiments of the present invention, the message send engine sets a corresponding toggle bit inside the second data buffer to a valid status after payload data is copied in a related empty memory location.

In further embodiments of the present invention, the message receive engine checks the valid status of the toggle bits inside the second data buffer before allocating empty memory locations inside the second memory region of the second memory system inside the receiving hardware system.

In further embodiments of the present invention, a first hardware system and second hardware system each are implemented to act as a sending hardware system or as a receiving hardware system to exchange message data in a bidirectional way both including the message send engine and the message receive engine and a memory system with the first data buffer, the second data buffer, and the memory region.

In another embodiment of the present invention, a data processing program for execution in a data processing system includes software code portions for performing a method for exchanging message data in a distributed computer system when the program is run on the data processing system.

In yet another embodiment of the present invention, a computer program product stored on a computer-usable medium, and includes computer-readable program means for causing a computer to perform a method for exchanging message data in a distributed computer system when the program is run on the computer.

Embodiments of the present invention disclosed herein improve the throughput in a non-transparent bridge, commonly used to interlink the different address spaces in Peripheral Connect Interface (PCI) express connected devices. An important step during the building process of a hybrid system is the design of a high-speed system interconnection between the separated system nodes. As each subsystem implements its own address space, non-transparent bridges are commonly used to interlink the different address spaces. A non-transparent bridge includes an address translation unit to translate addresses from one address space to the other. Memory read operations through the non-transparent bridges are much more expensive with respect to latency and throughput than memory write operations as messages have to be translated twice, once for the read request and a second time for the corresponding reply. Furthermore the reading program has to remember its command until the reply has arrived while a remote write operation does not have to wait for any reaction. Therefore embodiments of the present invention only use memory write operations to the remote side to reduce latency and improve the throughput.

Embodiments of this invention implement a new store optimized message engine and protocol which only uses memory writes to the remote side to reduce latency and improve the throughput. The direct remote write at the bus translated address gives the minimum latency in data transfer. The inventive arrangement for exchanging message data in a distributed computer system includes a message send engine on the sender side and a message receive engine on the receiver side with each message engine having a ring buffer which is only written by the remote engine and read locally. This invention defines a write optimized generic queue architecture, which can be used for every class of PCI card running an own operating system with local memory.

Embodiments of the present invention use physically separated memory and only one copy operation to transfer data from one memory system to the other memory system. A data descriptor ring buffer is located as first data ring buffer in the memory system of the sending hardware system and a metadata ring buffer is located as second data ring buffer in the memory system of the receiving hardware system, for example. The message send engine implements an algorithm to copy messages based on the protocol, and the message receive engine implements an algorithm receiving these messages without remote data access.

The above, as well as additional purposes, features, and advantages of the present invention will become apparent in the following detailed written description.

Figure 4:
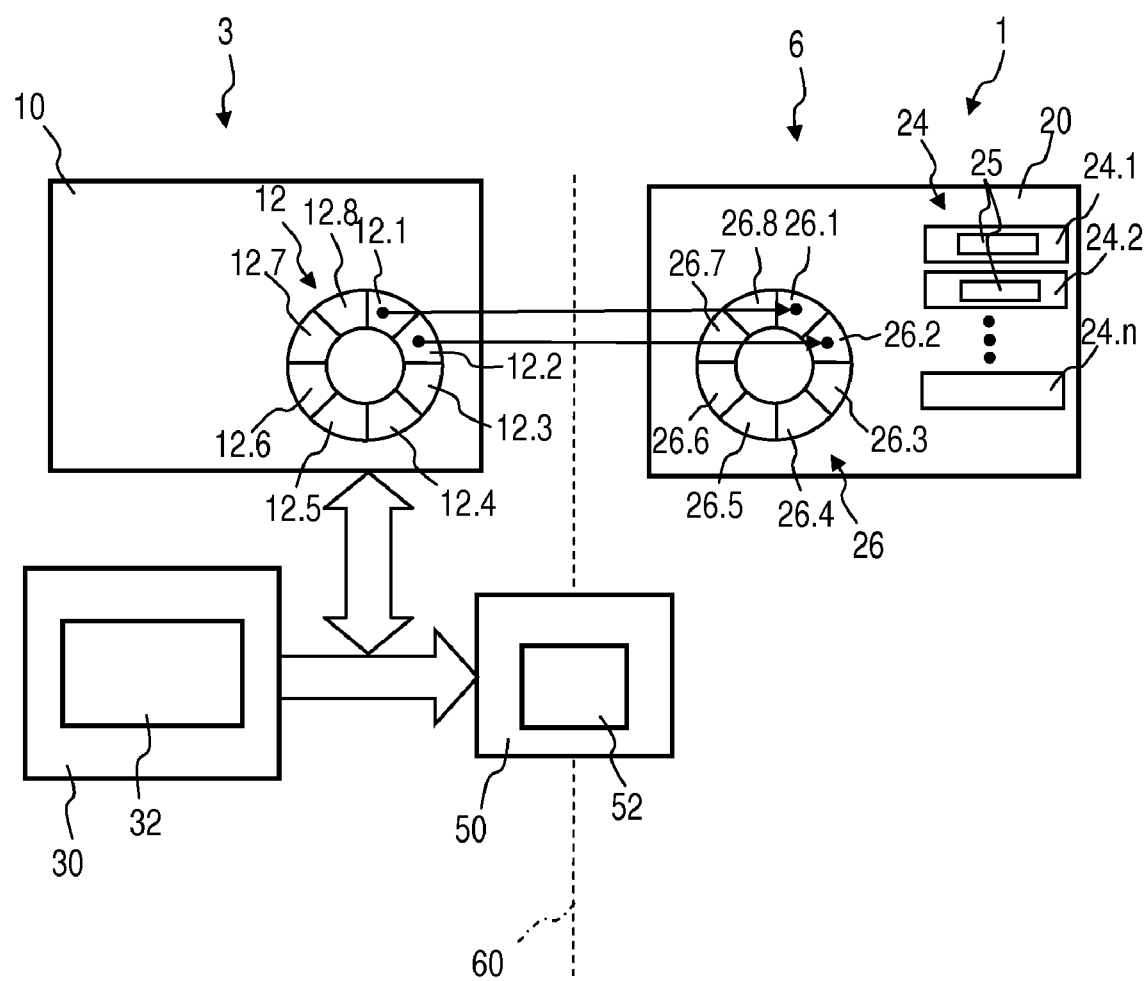

FIG. 1 is showing an arrangement for exchanging message data in a distributed computer system 1; in accordance with an embodiment of the present invention, and FIGS. 2 to 4 are showing parts of the arrangement for exchanging message data in the distributed computer system of FIG. 1, each showing a different situation during the transfer of message data.

Referring to FIGS. 1 to 4, the shown embodiment of the invention employs a computer system 1 including a plurality of hardware systems of which only a first hardware system 3 and a second hardware system 6 are shown. The first hardware system 3 and the second hardware system 6 are coupled via a non-transparent bridge unit 50 including an address translation unit 52 to translate addresses from the first memory region 14 to the second memory region 24 and visa versa, wherein a system boundary is represented by dashed line. The first hardware system 3 includes a first memory system 10 with a first data buffer 12 including a plurality of buffer locations 12.1 to 12.8, a second data buffer 16 including a plurality of buffer locations 16.1 to 16.8, a first memory region 14 including a plurality of memory locations 14.1 to 14.$n$, and first controller unit 30 including a first message send engine 32 and a first message receive engine 34. The second hardware system 6 includes a second memory system 20 with a first data buffer 22 including a plurality of buffer locations 22.1 to 22.8, a second data buffer 26 including a plurality of buffer locations 26.1 to 26.8, a second memory region 24 including a plurality of memory locations 24.1 to 24.$n$, and a second controller unit 40 including a second message send engine 32 and a second message receive engine 34. The non-transparent bridge unit 50 is implemented as PCI express bus bridge unit, wherein the first memory system 10 and/or the second memory system 20 are mapped to the non-transparent PCI express bus bridge unit 50.

The store optimized message engine and protocol according to the invention includes a message send engine 32, 42 on a sender side and a message receive engine 34, 44 on a receiver side. For a bidirectional connection both hardware systems 3, 6 include a message send engine 32, 42 and a message receive engine 34, 44. The data buffers 12, 16, 22, 26 are all implemented as ring data buffers.

To simplify matters, in the following only a unidirectional connection is described, wherein the first hardware system 3 is acting as sending hardware system and the second hardware system 6 is acting as receiving hardware system. For the situation that the first hardware system 3 is acting as receiving hardware system and the second hardware system 6 is acting as sending hardware system same steps have to be performed in a reverse fashion.

According to the invention the message send engine 32 is located inside the sending hardware system 3 and the corresponding message receive engine 44 is located inside the receiving hardware system 6, wherein the first data buffer 12 located inside the sending hardware system 3 is assigned to the message receive engine 44 inside the receiving hardware system 6 and the second data buffer 26 located inside the receiving hardware system 6 is assigned to the message send engine 32 inside the sending hardware system 3. The message receive engine 44 allocates empty memory locations 24.1 to 24.$n$ inside the second memory region 24 of the second memory system 20 inside the receiving hardware system 6, and writes information about the empty memory locations 24.1 to 24.n to the first data buffer 12 of the first memory system 10. This Situation is shown in FIG. 2, where the receiving hardware system 6 is writing the information about the empty memory locations 24.1 and 24.2 to related buffer locations 12.1 and 12.2 of the first data buffer 12.

The message send engine 32 copies payload data 25 directly from the sending hardware system 3 to the empty memory locations 24.1 to 24.n inside the second memory region 24 of the second memory system 20 inside the receiving hardware system 6 according to the information written to the first data buffer 12. This situation is shown in FIG. 3 where the message send engine 32 copies payload data 25 directly from the sending hardware system 3 to the empty memory locations 24.1 and 24.2 inside the second memory region 24 of the second memory system 20 inside the receiving hardware system 6 according to the information written to the related buffer locations 12.1 and 12.2 of the first data buffer 12.

After the transfer of payload data 25 the message send engine 32 writes information about the copied payload data 25 to the second data buffer 26 of the second memory system 20 inside the receiving hardware system 6. This Situation is shown in FIG. 4, where the sending hardware system 3 is writing the information about the copied payload data 25 to related buffer location 26.1 and 26.2 of the second data buffer 26.

In other words, each message engine 32, 34, 42, 44 has a ring buffer 12, 16, 22, 26 which is only written by the remote engine and read locally. The first message send engine ring buffer 12 which represents a data descriptor ring buffer is used to store information about empty memory locations 24.1 to 24.n in the second memory region 20 of the receiving hardware system 6. The empty memory locations 24.1 to 24.n can be allocated in any memory that is capable to the PCI Express bus. After the receiving hardware system 6 has allocated empty memory locations 24.1 to 24.n it writes the mapped addresses, buffer lengths and toggle bits into the data descriptor ring buffer 12 on the sending hardware system 3. The sending hardware system 3 checks the toggle bits for a changed state. If a changed toggle bit indicates an empty memory location 24.1 to 24.n the sending hardware system 3 sets up the address translation unit 52 of the non-transparent bridge 50 and copies the data directly into the allocated memory location 24.1 to 24.n.

Thus a single remote copy operation is sufficient and no second copy on the receiving hardware system 6 is needed. After the data 25 has been transmitted, the sending hardware system 3 writes the data length into the second ring buffer 26 of the receiving hardware system 6 which represents a metadata ring buffer of the receiving hardware system 6 and sets the toggle bit to indicate the newly transmitted data.

The receiving hardware system 6 does not have a static general receive buffer. The receiving hardware system 6 decides dynamically at which position the sending hardware system 3 has to store each data block in the target memory region 20 of the receiving hardware system 6. The memory region 20 of the receiving hardware system is provided/bound to an application.

As mentioned above, in the shown embodiment the arrangement for exchanging message data in a distributed computer system the first hardware system 3 and the second hardware system 6 each are implemented to act as sending hardware system or as receiving hardware system to exchange message data in a bidirectional way both including the message send engine 32, 42 and the message receive engine 44, 34 and a memory system 10, 20 with the first data buffer 12, 22, the second data buffer 16, 26, and the memory region 14, 24.

Figure 5:
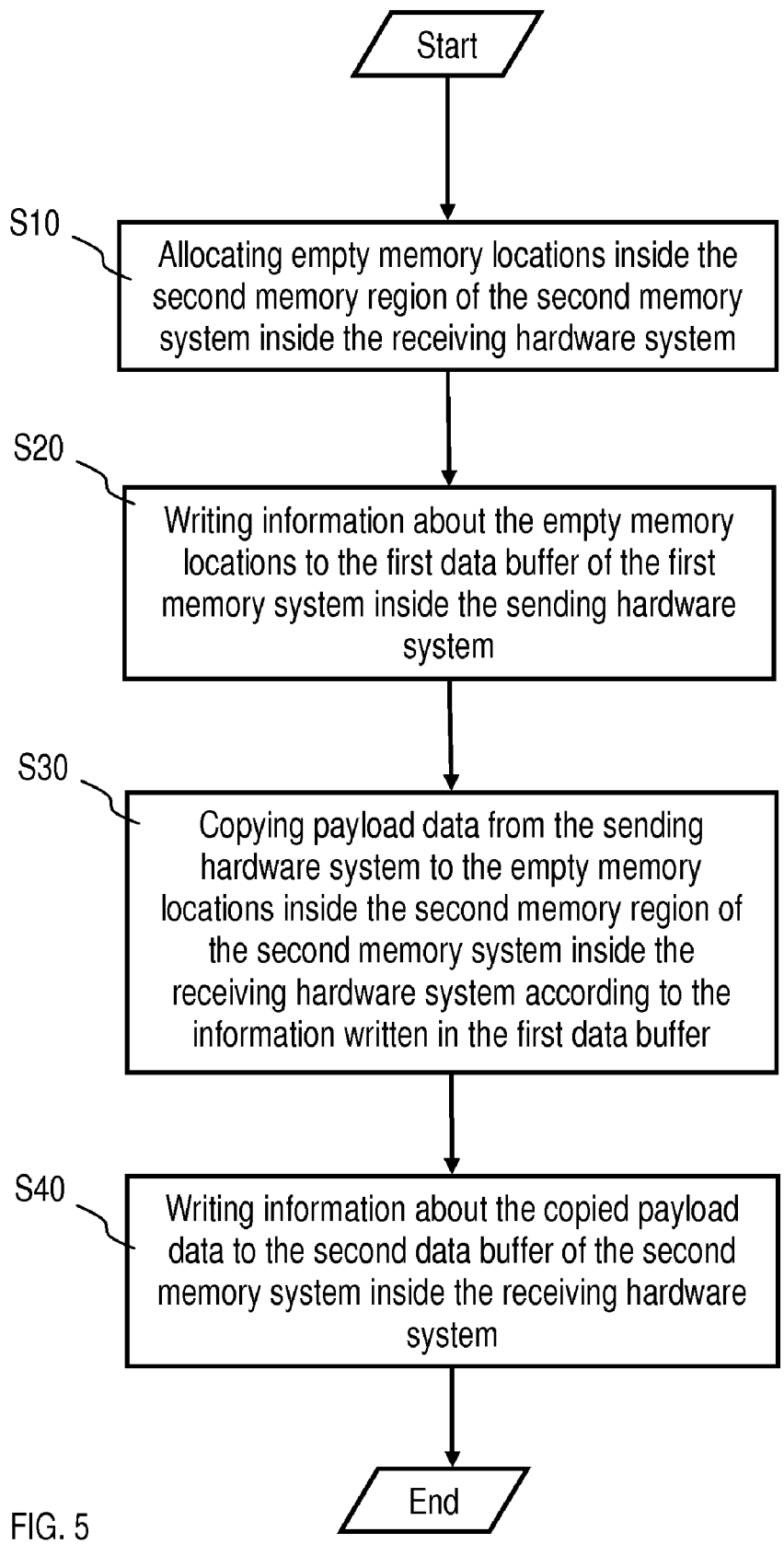
FIG. 5 is a schematic flow chart of a method for exchanging message data in a distributed computer system, in accordance with an embodiment of the present invention.

FIG. 5 shows a schematic flow chart of a method for analyzing a distributed computer system, in accordance with an embodiment of the present invention.

Referring to FIG. 4 the flowchart depicts how the arrangement for analyzing the distributed computer system 1 will be used. According to the invention the method for exchanging message data in a distributed computer system 1 between the sending hardware system 3 and the receiving hardware system 6 is allocating empty memory locations 24.1 to 24.n inside the second memory region 24 of the second memory system 20 inside the receiving hardware system 6 in a step S10. In a step S20 information about the empty memory locations 24.1 to 24.n is written to the first data buffer 12 of the first memory system 10 inside the sending hardware system 3. This information includes mapped address data and/or memory location length information for each empty memory location 24.1 to 24.n, for example. During step S30 payload data 25 is copied directly from the sending hardware system 3 to the empty memory locations 24.1 to 24.n inside the second memory region 24 of the second memory system 20 inside the receiving hardware system 6 according to the information written to the first data buffer 12. In step S40 information about the copied payload data 25 is written to the second data buffer 26 of the second memory system 20 inside the receiving hardware system 6. This information includes length information for each payload data set copied in an empty memory location 24.1 to 24.n.

The inventive method for exchanging message data in a distributed computer system can be implemented as an entirely software embodiment, or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD. A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

We claim:

1. A system for exchanging message data in a distributed computer system between i) a sending hardware system comprising a first memory system with a first data buffer and a first memory region, and ii) a receiving hardware system comprising a second memory system with a second data buffer and a second memory region, wherein the sending hardware system and the receiving hardware system are coupled via a non-transparent bridge unit, the system comprising:

a message send engine located inside the sending hardware system and a message receive engine located inside the receiving hardware system;

wherein:

the first data buffer located inside the sending hardware system is assigned to the message receive engine inside the receiving hardware system;

the second data buffer located inside the receiving hardware system is assigned to the message send engine inside the sending hardware system;

the message receive engine allocates empty memory locations inside the second memory region of the second memory system inside the receiving hardware system, and writes information about the empty memory locations to the first data buffer of the first memory system;

the message send engine copies payload data directly from the sending hardware system to the empty memory locations inside the second memory region of the second memory system inside the receiving hardware system according to the information written to the first data buffer;

the message send engine writes information about the copied payload data to the second data buffer of the second memory system inside the receiving hardware system;

the non-transparent bridge unit is implemented as a PCI express bus bridge unit comprising an address translation unit, wherein the first memory system or the second memory system are mapped to the non-transparent bridge unit; and the first data buffer or the second data buffer are implemented as ring data buffers.

2. The system according to claim 1, wherein the message receive engine sets a corresponding toggle bit inside the first data buffer to a valid status when information about an empty memory location is written in a related buffer location of the first data buffer.

3. The system according to claim 2, wherein the message send engine checks the valid status of the toggle bits inside the first data buffer before copying payload data to the second memory region of the second memory system inside the receiving hardware system.

4. The system according to claim 1, wherein the message send engine sets a corresponding toggle bit inside the second data buffer to a valid status after payload data is copied in a related empty memory location.

5. The system according to claim 4, wherein the message receive engine checks the valid status of the toggle bits inside the second data buffer before allocating empty memory locations inside the second memory region of the second memory system inside the receiving hardware system.

6. The system according to claim 1, wherein a first hardware system and second hardware system each are implemented to act as sending hardware system or as receiving hardware system to exchange message data in a bidirectional way both comprising the message send engine and the message receive engine and a memory system with the first data buffer, the second data buffer, and the memory region.

* * * * *